US012265914B2

(12) United States Patent
Desaulniers et al.

(10) Patent No.: US 12,265,914 B2
(45) Date of Patent: Apr. 1, 2025

(54) MACHINE LEARNING AND OPTIMIZATION TECHNIQUES FOR JOB SCHEDULING

(71) Applicant: Kyndryl, Inc., New York, NY (US)

(72) Inventors: Robert Bradley Desaulniers, Crested Butte, CO (US); Clea Anne Zolotow, Key West, FL (US); Mihai Criveti, Dublin (IE); Ana Maria Bezerra Maimoni, Sao Paulo (BR)

(73) Assignee: Kyndryl, Inc., New York, NY (US)

( * ) Notice: Subject to any disclaimer, the term of this patent is extended or adjusted under 35 U.S.C. 154(b) by 895 days.

(21) Appl. No.: 17/408,078

(22) Filed: Aug. 20, 2021

(65) Prior Publication Data

US 2023/0055415 A1  Feb. 23, 2023

(51) Int. Cl.
*G06N 3/09* (2023.01)
*G06F 11/30* (2006.01)
(Continued)

(52) U.S. Cl.
CPC ......... *G06N 3/092* (2023.01); *G06F 11/3006* (2013.01); *G06F 11/3037* (2013.01);
(Continued)

(58) Field of Classification Search
CPC ...... G06N 3/08; G06N 3/092; G06F 18/2113; G06F 11/3006; G06F 11/3037; G06F 11/3409
See application file for complete search history.

(56) References Cited

U.S. PATENT DOCUMENTS 10,203,991 B2 * 2/2019 Brady ................. G06F 9/5077
10,901,788 B2 * 1/2021 Venkadasamy ..... G06F 11/3024
(Continued)

FOREIGN PATENT DOCUMENTS

CN    108874542 A    11/2018
CN    110413391 A    11/2019
(Continued)

OTHER PUBLICATIONS

NPL Amidi Recurrent Neural Networks cheatsheet 2019 Wayback.*
(Continued)

*Primary Examiner* — Paul M Knight
(74) *Attorney, Agent, or Firm* — CANTOR COLBURN LLP; Erik Swanson

(57) ABSTRACT

A method includes training a recurrent neural network by monitoring data in a memory of a first server as the first server executes jobs and by determining an amount of computing resources used by the first server while executing the jobs and applying the recurrent neural network to data in the memory to predict an amount of computing resources that the first server will use when executing a first future job. The method also includes, in response to determining that execution of the first future job did not meet a performance criterion, making a change to the first server. The method further includes further training the recurrent neural network using a reinforcement learning technique, applying the recurrent neural network to determine that the change should be made to a second server, and in response, making the change to the second server before the second server executes a second future job.

20 Claims, 8 Drawing Sheets

(51) Int. Cl.
   *G06F 11/34*     (2006.01)
   *G06F 18/2113*   (2023.01)
   *G06N 3/08*      (2023.01)
   *G06N 3/092*     (2023.01)

(52) U.S. Cl.
   CPC ...... *G06F 11/3409* (2013.01); *G06F 18/2113* (2023.01); *G06N 3/08* (2013.01)

(56) References Cited

U.S. PATENT DOCUMENTS

| | | | | |
|---|---|---|---|---|
| 2013/0179881 A1* | 7/2013 | Calder | .................. | G06F 9/5072 718/1 |
| 2017/0169529 A1* | 6/2017 | Delaney | .............. | H04L 41/0826 |
| 2021/0133179 A1* | 5/2021 | Lee | ........................ | G06F 9/4881 |
| 2023/0297088 A1* | 9/2023 | Turner | .................... | G06N 3/045 700/100 |

FOREIGN PATENT DOCUMENTS

| | | |
|---|---|---|
| CN | 110941421 A | 3/2020 |
| CN | 111984381 A | 11/2020 |
| CN | 112084040 A | 12/2020 |
| IN | 112073239 A | 12/2020 |

OTHER PUBLICATIONS

NPL Ding Performance to Power Ratio Aware Resource Consolidation RL Cloud 2020.*
NPL DNSStuff Virtual Machine VM Resource Allocation Guide Jul. 2021.*
NPL Fu Failure aware resource management 2010.*
NPL Kiswany VMFlock Virtual Machine CoMigration for the Cloud 2011.*
NPL Leelipushpam Live Mitragion Techniques in Cloud 2013.*
NPL Mohammadi Deep Learning for IoT Big Data and Streaming Analytics 2018.*
NPL Nia A static VM placement and hybrid job scheduling model for green datacenters 2020.*
NPL Ramesh Machine Learning for Load Balancing in Cloud Datacenters May 2021.*
NPL Rjoub Deep and reinforcement learning for task scheduling cloud computing systems 2020.*
NPL Scarff Understanding Backpropagation Jan. 2021.*
NPL Sun Marvel 2020.*
NPL Wang Integrating recurrent neural networks and reinforcement learning 2020.*
NPL Yeo Achieving Balanced Load Distribution with RL Switch Migration Jan. 2021.*
NPL Zhu A novel approach to workload prediction using attention LSTM in cloud 2019.*
NPL Aken An Inquiry into ML based Automatic Configuration Mar. 2021.*
NPL Gari RL based application Autoscaling in the Cloud A survey May 2021.*
NPL Rao Vconf A Reinforcement Learning Approach to VM Autoconfiguration 2012.*
NPL Zhang End to End Automatic Cloud Database Tuning System Using DRL 2019.*
NPL Zhang Q placement Reinforcement Learning Based Service Placement 2018.*
"Understanding the elements in the batch environment," IBM, Websphere Application Server, 8.5.5, 1993, 3 pages.
Emmanuel Maggiori, "Recurrent Neural Networks to Correct Satellite Image Classification Maps," IEEE Transactions on Geoscience and Remote Sensing, Apr. 21, 2017, 10 pages.
Oleg Chunikhin, "Implementing Advanced Scheduling Techniques with Kubernetes," The Newstack, Apr. 27, 2018, 23 pages.
Wikipedia, "Linearizability," [Accessed Online https://en.wikipedia.org/wiki/Linearizability] 10 pages, viewed Jul. 8, 2021 https://en.wikipedia.org/wiki/Linearizability.
Ravi Lachhman, "Why Idempotency and Ephemerality Matter in a Cloud-Native World," Appdynamics, Sep. 19, 2018, 7 pages.
Ke Li, "BAIR Berkeley Artificial Intellegence Research," Sep. 12, 2017, 14 pages.
Command Reference Guide, "CA Workload Automation CA 7 Edition," Version 12.0.00, 2015, 726 pages.
Phil de Valence, "How to Migrate Mainframe Batch to Cloud Microservices with Blu Age and AWS," Mar. 9, 2018, 13 pages.
Chris Mellor, "Analyse this: IBM Moves Watson machine learning to mainframes," Feb. 16, 2017, 11 pages.
Yang You et al., "Large Batch Optimization for Deep Learning: Training BERT in 76 Minutes," Jan. 3, 2020, 37 pages.
Kubernetes—CronJob—viewed Jul. 8, 2021: https://kubernetes.io/docs/concepts/workloads/controllers/cron-jobs/.
Fauzi, Humam "Batch, Docket and Machine Learning" Feb. 1, 2019. viewed <https://medium.com/@humam.fauzi/batch-docker-and-machine-learning-77b69534b27b>.
Computer Science, "RNN Learning an Iterative Algorithm", viewed Aug. 16, 2021 <https://cs.stackexchange.com/questions/83875/rnn-learning-an-iterative-algorithm>.

* cited by examiner

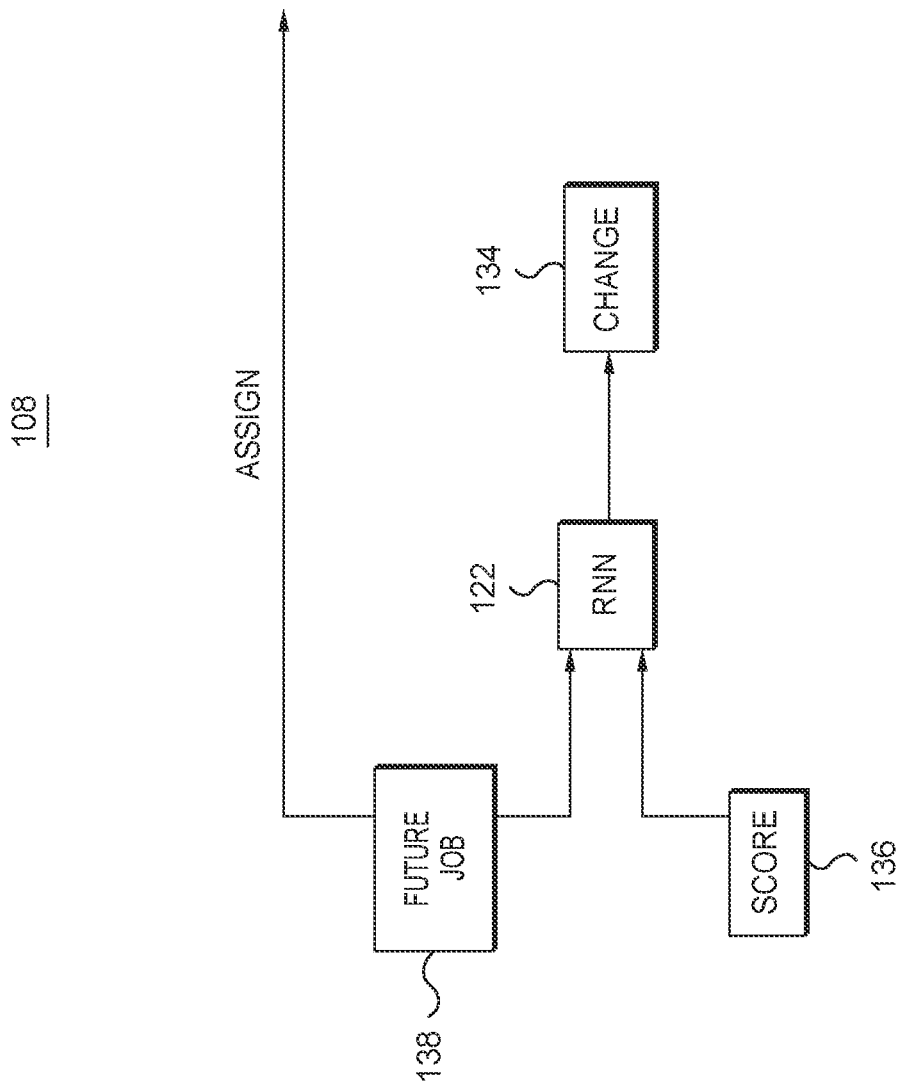

MACHINE LEARNING AND OPTIMIZATION TECHNIQUES FOR JOB SCHEDULING

BACKGROUND

The present invention relates to job scheduling, and more specifically, to machine-learning-assisted job scheduling using a recurrent neural network and a reinforcement learning technique.

SUMMARY

According to an embodiment, a method includes training a recurrent neural network by monitoring data in a memory of a first server as the first server executes jobs and by determining an amount of computing resources used by the first server while executing the jobs and applying the recurrent neural network to starting data in the memory to predict an amount of computing resources that the first server will use when executing a first future job. The method also includes assigning the first future job to execute on the first server based on the predicted amount of computing resources and in response to determining that execution of the first future job did not meet a performance criterion, making a change to the first server of the computing system. The method further includes in response to determining that execution of the first future job after making the change to the first server did meet the performance criterion, further training the recurrent neural network using a reinforcement learning technique and based on the change, applying the recurrent neural network to determine that the change should be made to a second server of the computing system before the second server executes a second future job and in response, making the change to the second server before the second server executes the second future job. The method also includes assigning the second future job to execute on the second server. Other embodiments include an apparatus that performs this method and a computer program product executable to perform this method.

BRIEF DESCRIPTION OF THE SEVERAL VIEWS OF THE DRAWINGS

FIG. 1E illustrates an example computing system of the system of FIG. 1A.

DETAILED DESCRIPTION

Computer workload orchestration and scheduling engines use simple binary rules to decide where and when to execute workloads in computing systems. For large computing environments (e.g., environments with many servers on which to execute workloads), however, using these simple binary rules to schedule jobs can be inefficient, and not adaptable to changes in the execution environment or patterns in workload recurrence. For example, existing workload orchestration systems utilize linear workload scheduling and placement algorithms that are incapable of responding to changes in workloads or environments. These systems use single mechanisms to schedule workload, such as spread (e.g., place containers on as many active nodes), packed (e.g., preferred single node), or random, but these systems do not determine whether changes have occurred in the execution environment or workload or whether these changes impact how the workload should be scheduled. As a result, these systems may assign jobs inefficiently, which results in excessive computing resource usage, job failure, or large carbon footprints.

This disclosure contemplates a computing system that schedules jobs using a recurrent neural network (RNN) and a reinforcement learning technique. Generally, the RNN is trained to predict how an execution environment (e.g., servers on a private and/or public cloud) will change over time based on the current state of the execution environment (e.g., data stored in a memory of a server). The RNN uses this prediction to determine whether the execution environment is expected to have sufficient computing resources to execute a job at a future time. The reinforcement learning technique is used to further train the RNN to account for changes to the execution environment in determining whether execution of the job will meet a performance criterion (e.g., whether the job executed successfully, a carbon footprint threshold, or a cloud utilization threshold). The changes may include upgrades or updates to the execution environment (e.g., new hardware, additional servers, or new software) and changes to the performance criterion (e.g., reduced carbon footprint demands or increased private cloud utilization requirements). In this manner, the RNN schedules jobs using a dynamic process that improves the efficiency of job execution while meeting performance criteria, in certain embodiments.

Figure 1A:
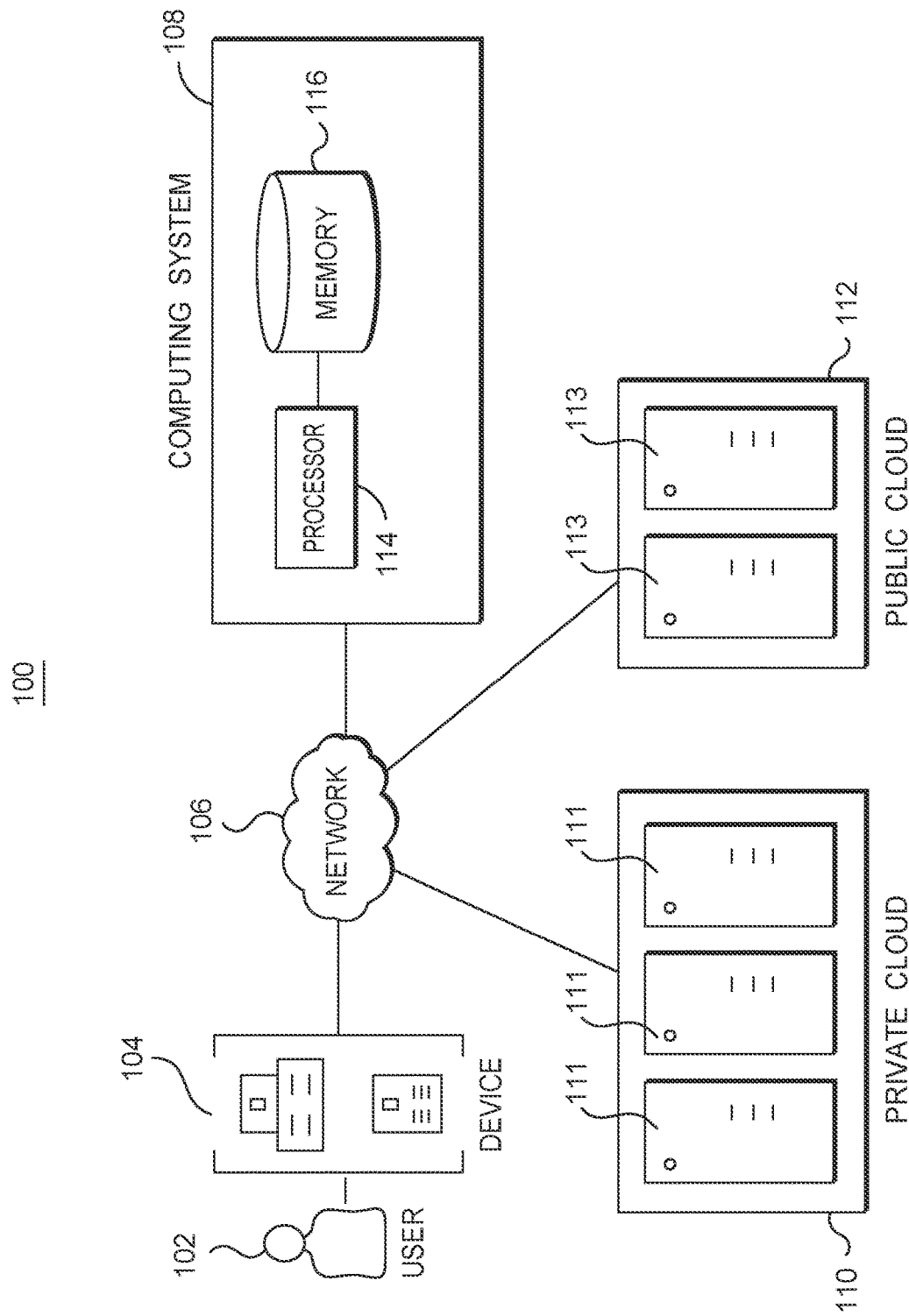
FIG. 1A illustrates an example system.

FIG. 1A illustrates an example system 100. As seen in FIG. 1A, the system 100 includes one or more devices 104, a network 106, a computing system 108, a private cloud 110, and a public cloud 112. The computing system 108 implements and trains a machine learning model, such as a RNN, to schedule jobs onto the private cloud 110 and/or the public cloud 112. The computing system 108 also uses a reinforcement learning technique to further train the RNN to adapt and account for changes in predicting whether execution of scheduled jobs will meet performance criteria. The computing system 108 then applies the RNN to schedule jobs so that the jobs execute successfully and meet the performance criteria, in particular embodiments.

A user 102 uses a device 104 to interact with other components of the system 100. For example, the user 102 may use the device 104 to initiate jobs. The device 104 communicates the jobs to the computing system 108 for scheduling. As another example, the user 102 may use the device 104 to view the results of executing jobs (e.g., whether the jobs executed successfully or met certain performance criteria). The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The computing system 108 trains RNN to schedule jobs for execution. The computing system 108 may further train the R&N using a reinforcement learning technique to adapt and account for changes in the system 100 in predicting whether executing jobs will meet a performance criterion. The computing system 108 then applies the RNN to schedule jobs such that the jobs execute successfully and meet the performance criterion, in particular embodiments. As seen in the example of FIG. 1A, the computing system 108 includes a processor 114 and a memory 116, which perform the actions and functions of the computing system 108 described herein.

The processor 114 is any electronic circuitry, including, but not limited to one or a combination of microprocessors, microcontrollers, application specific integrated circuits (ASIC), application specific instruction set processor (ASIP), and/or state machines, that communicatively couples to memory 116 and controls the operation of the computing system 108. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on the memory 116 to perform any of the functions described herein. The processor 114 controls the operation and administration of the computing system 108 by processing information (e.g., information received from the devices 104, network 106, and memory 116). The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

The private cloud 110 and the public cloud 112 form an execution environment for the jobs in the system 100. The private cloud 110 and the public cloud 112 include servers 111 and 113 onto which jobs may be scheduled for execution. The private cloud 110 includes servers 111 that are accessible to only a limited set of parties (e.g., the owners or operators of the computing system 108). The public cloud 112 includes servers 113 that are accessible by a large set of parties or the general public. Generally, it may be desirable to schedule as many jobs as possible onto the private cloud 110 before scheduling jobs onto the public cloud 112.

The computing system 108 may schedule a job to execute on a server 111 or 113 in the private cloud 110 or the public cloud 112. When a job is scheduled onto a server 111 or 113, that server 111 or 113 executes the job at a particular time set according to the schedule. The computing system 108 applies the RNN to predict which servers 111 or 113 in the private cloud 110 or the public cloud 112 will have sufficient resources to execute the job at the time the job is scheduled to execute. Additionally, the computing system 108 applies the RNN to predict which servers 111 or 113 in the private cloud 110 or the public cloud 112 can execute the job while meeting a performance criterion (e.g., successful job execution, a carbon footprint threshold, or a cloud utilization threshold). Based on the predictions of the RNN, the computing system 108 selects a server 111 or 113 on the private cloud 110 or the public cloud 112 to schedule the job.

For example, the computing system 108 may schedule a job onto a server 111 in the private cloud 110 because the RNN predicts that that server 111 will have sufficient computing resources available to execute the job and that that server 111 will execute the job successfully. As another example, the computing system 108 may schedule a job onto a server 113 in the public cloud 112 because the RNN predicts that that server 113 will have sufficient resources to execute the job and that that server 113 will generate the smallest carbon footprint (e.g., use the least amount of electrical power) when executing the job. As yet another example, the computing system 108 may schedule a job onto a server 111 in the private cloud 110 because the RNN predicts that that server 111 will have sufficient computing resources available to execute the job and that scheduling the job onto that server 111 will increase a ratio of utilization of the private cloud 110 relative to a utilization of the public cloud 112 above a threshold.

In some embodiments, the computing system 108 may be in the execution environment. The computing system 108 may apply the RNN to predict whether the computing system 108 will have sufficient resources available to execute jobs, and the computing system 108 may schedule jobs for itself. The computing system 108 may also apply the RNN to determine if changes should made to the computing system 108 before the computing system 108 executes a job.

Figure 1B:
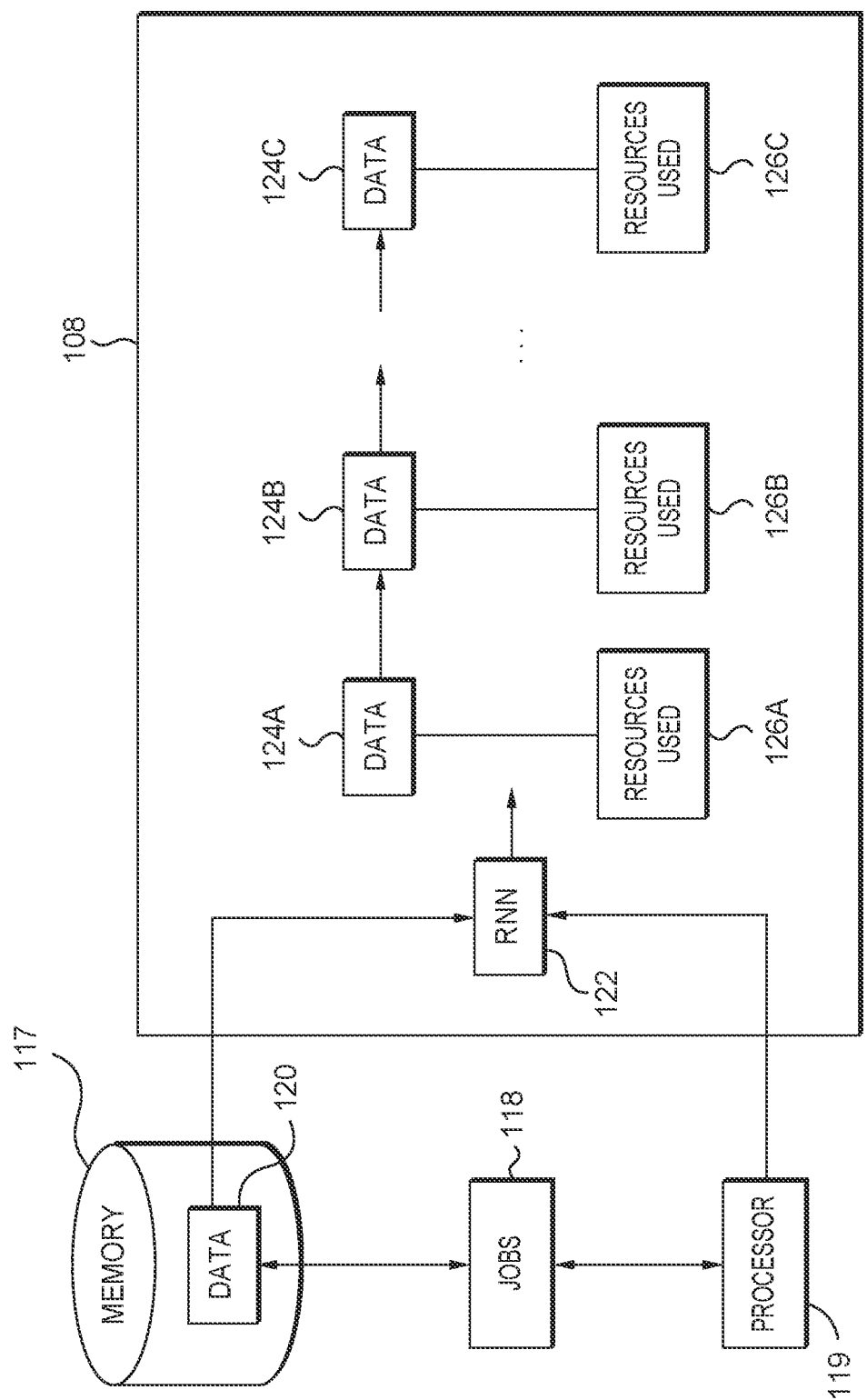
FIG. 1B illustrates an example computing system of the system of FIG. 1A.

FIG. 1B illustrates the computing system 108 of FIG. 1A training the RNN. Generally, the computer system 108 monitors information within the servers 111 or 113 of the private cloud 110 or the public cloud 112 while the servers 111 or 113 are executing jobs to train a RNN to recognize and predict the resource usage of the servers 111 or 113. The computing system 108 may then apply the RNN to predict future resource consumption of the servers 111 or 113 based on previous and current states of the servers 111 or 113.

The computing system 108 monitors a memory 117 and a processor 119 of a server 111 or 113 in the private cloud 110 or the public cloud 112 while the server 111 or 113 executes jobs 118. As the server 111 or 113 executes the jobs 118, the utilization of the processor 119 may increase. Additionally, data 120 stored in the memory 117 may change. For example, the jobs 118 may add, remove, or update the data 120 in the memory 117 as the jobs 118 execute. The computing system 108 monitors the state of the data 120 and the utilization of the processor 119 and/or the memory 117 as the jobs 118 execute. The computing system 108 uses this information to train the RNN 122. The RNN 122 uses this information to detect patterns in the utilization of the resources in the server 111 or 113, and to determine how these patterns correspond to the data 120 in the memory 117. As the RNN 122 receives more information about the server 111 or 113 and how the server 111 or 113 is utilized while executing the jobs 118, the RNN 122 may learn how to predict the progression of the data 120 in the memory 117 and/or the progression of resource usage in the server 111 or 113.

The memory 117 and the processor 119 may be included in any of the server 111 or 113 in the private cloud 110 or the public cloud 112. The memory 117 and the processor 119 may perform any of the functions or actions of the servers 111 or 113 described herein (e.g., executing jobs).

The processor 119 is any electronic circuitry, including, but not limited to one or a combination of microprocessors, microcontrollers, application specific integrated circuits (ASIC), application specific instruction set processor (ASIP), and/or state machines, that communicatively couples to memory 117 and controls the operation of the server 111 or 113. The processor 119 may be 8-bit, 16-bit, 32-bit, 64-bit or of any other suitable architecture. The processor 119 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 119 may include other hardware that operates software to control and process information. The processor 119 executes software stored on the memory 117 to perform any of the functions described herein. The processor 119 controls the operation and administration of the server 111 or 113 by processing information (e.g., information received from the computing system 108, network 106, and memory 117). The processor 119 is not limited to a single processing device and may encompass multiple processing devices.

The memory 117 may store, either permanently or temporarily, data, operational software, or other information for the processor 119. The memory 117 may include any one or a combination of volatile or non-volatile local or remote devices suitable for storing information. For example, the memory 117 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 117, a disk, a CD, or a flash drive. In particular embodiments, the software may include an application executable by the processor 119 to perform one or more of the functions described herein.

After the RNN 122 is trained in this manner, the RNN 122 may be used to predict the resource utilization of a server 111 or 113 at a future time based on the previous or current state of the server 111 or 113. For example, the computing system 108 may monitor the data 120 in the memory 117 and send that information to the RNN 122. The RNN 122 then uses that information to determine how the data 120 is changing in the memory 117. Based on how the data 120 is changing, the RNN 122 predicts what that data 120 will be at a future time and the corresponding resource utilization of the server 111 or 113 at the future time.

In the example of FIG. 1B, the computing system 108 monitors the data 120 in the memory 117 and inputs that information to the RNN 122. The RNN 122 then predicts how the data 120 will progress in the future (e.g., progression from the data 120 to data 124A, data 124B, and eventually to 124C). Additionally, the RNN 122 predicts the resources used 126A, 126B and 126C by the server 111 or 113 in the future. Stated differently, the RNN 122 predicts that the data 120 in the server 111 or 113 will become the data 124A at a first future time. The RNN 122 also predicts the resources used 126A in the server 111 or 113 at the first future time. The RNN 122 then predicts that the data 124A will become the data 124B at a second future time. The RNN 122 also predicts the resources used 126B by the server 111 or 113 at the second future time. The RNN 122 predicts that the data 124B will become the data 124C at a third future time. The RNN 122 also predicts the resources used 126C in the server 111 or 113 at the third future time. The RNN 122 may make any number of predictions.

The computing system 108 uses these predictions to determine the amount of resources available in the server 111 or 113 at the future points in time. The computing system 108 then determines whether the server 111 or 113 will have sufficient resources available when the job is scheduled to execute. The computing system 108 may schedule the future job to the server 111 or 113 if the computing system 108 determines that the server 111 or 113 will have sufficient resources available at the time the job is scheduled to execute. The computing system 108 may schedule a job to a different server 111 or 113 if the computing system 108 determines that the server 111 or 113 will not have sufficient resources available at the time the job is scheduled to execute. For example, if the computing system 108 determines that none of the servers 111 in the private cloud 110 will have sufficient resources available when the job is scheduled to execute, the computing system 108 may schedule the job to a server 113 in the public cloud 112.

Figure 1C:
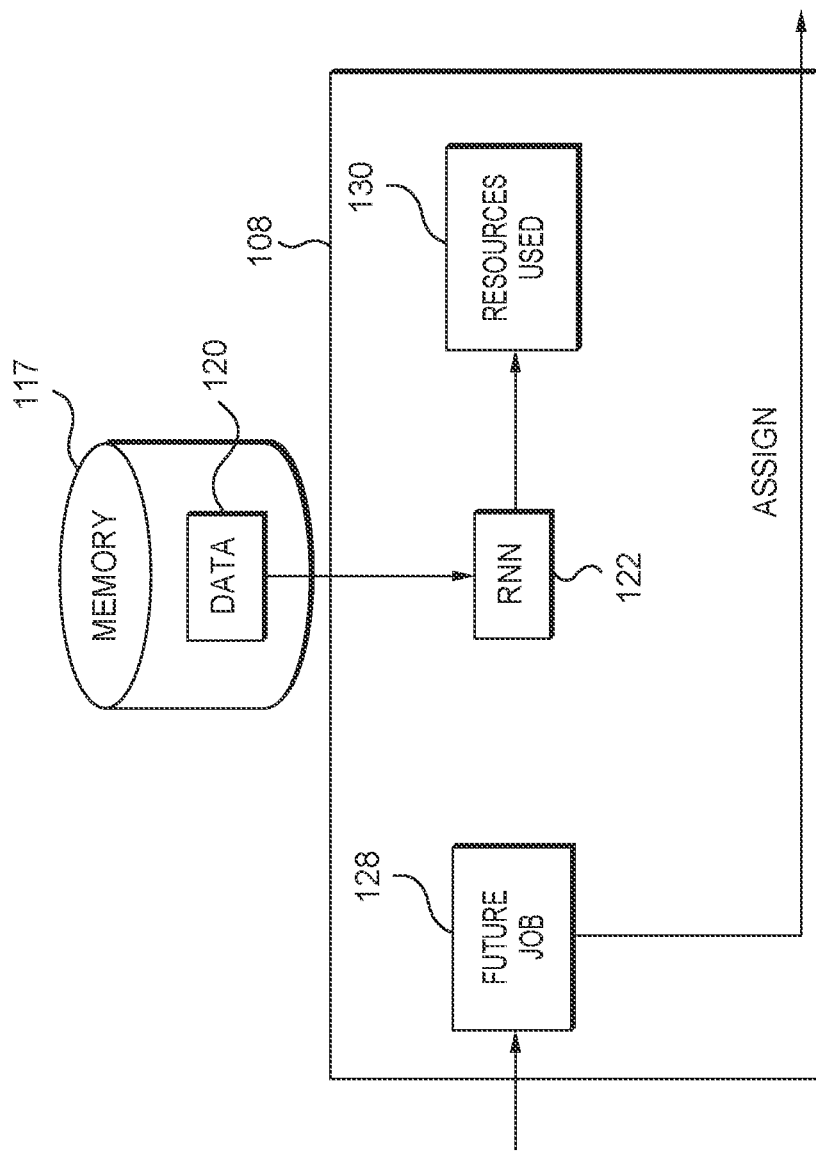
FIG. 1C illustrates an example computing system of the system of FIG. 1A.

FIG. 1C illustrates the computing system 108 applying the RNN 122 to schedule jobs. As seen in FIG. 1C, the computing system 108 monitors the data 120 in the memory 117 of a server 111 or 113 in the private cloud 110 or the public cloud 112. The RNN 122 predicts what the data 120 will be at a future point in time based on the previous or current state of the data 120 in the memory 117. Additionally, the RNN 122 predicts the resources used 130 by the server 111 or 113 at the future point in time. The computing system 108 uses the RNN's 122 prediction of the resources used 130 at the future point in time to determine whether the server 111 or 113 will have sufficient resources available to execute a future job 128 at the future point in time. If the server 111 or 113 is predicated to have sufficient resources available at the future point in time, the computing system 108 schedules the future job 128 to execute at that future point in time. Additionally, the computing system 108 assigns the future job 128 to that server 111 or 113 so that the server 111 or 113 executes the future job 128 at the future point in time. If the server 111 or 1113 is predicted to have insufficient resources available at the future point in time, the computing system 108 assigns the future job 128 to a different server 111 or 113 in the private cloud 110 or the public cloud 112. In this manner, the computing system 108 uses the predictions of the RNN 122 to schedule the future job 128 such that the future job 128 will execute successfully, in particular embodiments.

In some embodiments, the computing system 108 also monitors the execution of scheduled jobs to determine whether the results of the execution are unused or unnecessary. For example, the computing system 108 may monitor whether a user 102 views or accesses the results of executing a job or whether the results are used during execution of another job. If the results are unused or unnecessary, the computing system 108 may remove the job from schedules so that the job is no longer scheduled to execute in the future. In this manner, unused or unnecessary jobs are not executed, which saves computing resources in the execution environment, in certain embodiments.

Figure 1D:
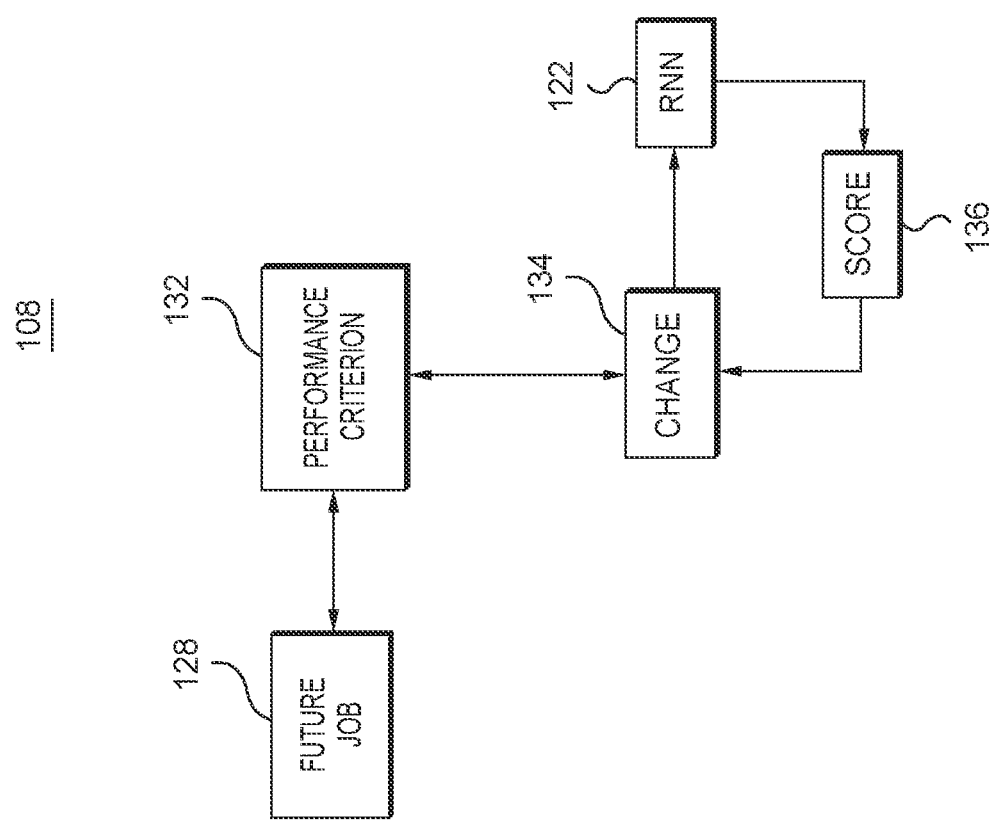
FIG. 1D illustrates an example computing system of the system of FIG. 1A.

FIG. 1D illustrates the computing system 108 using a reinforcement learning technique to further train the RNN 122 to adapt and account for changes in the execution environment in predicting whether execution of the future job 128 will meet a performance criterion. The computing system 108 monitors the execution of the future job 128 to determine whether the future job 128 meets a performance criterion 132. The performance criterion 132 may indicate any desirable factor that is evaluated during the execution of the future job 128. For example, the performance criterion 132 may indicate whether the future job 128 executed completely or successfully. The computing system 108 monitors the execution of the future job 128, and if the future job 128 executes completely or successfully on the server, then the computing system 108 determines that the future job 128 met the performance criterion 132. As another example, the performance criterion 132 may indicate a threshold carbon footprint (e.g., a maximum amount of electrical power to be used). The computing system 108 monitors the carbon footprint generated (e.g., the amount of electrical power used) by the server 111 or 1113 executing the future job 128. If that carbon footprint exceeds the threshold carbon footprint, then the computing system 108 determines that the performance criterion 132 was not met. If the carbon footprint falls below the threshold carbon footprint, then the computing system 108 determines that the performance criterion was met. As yet another example, the performance criterion 132 may indicate a threshold cloud utilization. The computing system 108 may compare the number of servers 111 in the private cloud 110 being used to execute jobs with the number of servers 113 in the public cloud 112 being used to execute jobs while the future job 128 is executing to determine a utilization ratio. Generally, it is desirable for the more servers in the private cloud 110 to be used and fewer servers 113 on the public cloud 112 to be used. For example, the utilization ratio may be a ratio of the percentage of the servers 113 in the public cloud 112 that are being used to the percentage 111 of the servers in the private cloud 110 that are being used. If the ratio is below the threshold cloud utilization, then the computing system 108 determines that the performance criterion 132 is met. On the other hand, if the ratio exceeds the threshold cloud utilization, then the computing system 108 determines that the performance criterion 132 was not met.

The computing system 108 may determine that a change 134 occurred in the execution environment. For example, the change 134 may be an update to the hardware or software of the servers 111 or 113 in the private cloud 110 and/or the public cloud 112. As another example, the change 134 may be a change to the performance criterion 132. The computing system 108 determines whether the change 134 affects whether the performance criterion 132 is met. The computing system 108 then trains the RNN 122 to account or adapt for the change 134. The computing system 108 assigns a score 136 to the change 134 based on whether the performance criterion 132 is met after the change 134 occurred. For example, if the performance criterion 132 is met after the change 134 occurred, then the computing system 108 may assign a positive score 136 to the change 134. If the performance criterion 132 is not met after the change 134 occurred, then the computing system 108 may assign a negative score 136 to the change 134. Using a previous example, if the future job 128 executed completely or successfully after the change 134 occurred, then the computing system 108 assigns a positive score 136 to the change 134. If the future job 122 failed to execute completely or successfully after the change 134 occurred, then the computing system 108 assigns a negative score 136 to the change 134. The computing system 108 then trains the RNN 122 using the change 134 and the score 136 so that the RNN 122 recognizes that the change 134 resulted in a positive or negative result. The computing system 108 may then apply the RNN 122 to other servers 111 or 113 to determine whether the change 134 should be made when executing jobs.

FIG. 1E illustrates the computing system 108 applying the RNN 122 to predict whether the change 134 should be made. As seen in FIG. 1E, the RNN 122 predicts whether the change 134 should be made based on a future job 138 and/or the score 136. For example, the RNN 122 may predict that the change 134 results in jobs executing completely or successfully based on the score 136 being a positive score. The RNN 122 may then analyze the future job 138 and determine that the future job 138 is similar to previous jobs that executed completely or successfully after the change 134 was made. As a result, the RNN 122 may predict that the change 134 should be made to a server 111 or 113 to which the future job 138 is scheduled before the future job 138 executes on that server 111 or 113. In response, the computing system 108 may make the change 134 in the server 111 or 113 or instruct the change 134 be made. For example, the computing system 108 may instruct that certain hardware in the server 111 or 113 be changed or upgraded. As another example, the computing system 108 may change a performance criterion 132 in the server 111 or 113. After the change 134 is made, the computing system 108 schedules the future job 138 and assigns the future job 138 to the server 111 or 113. In this manner, the computing system 108 ensures that execution of the future job 138 will meet the performance criterion 132, in particular embodiments.

Figure 2:
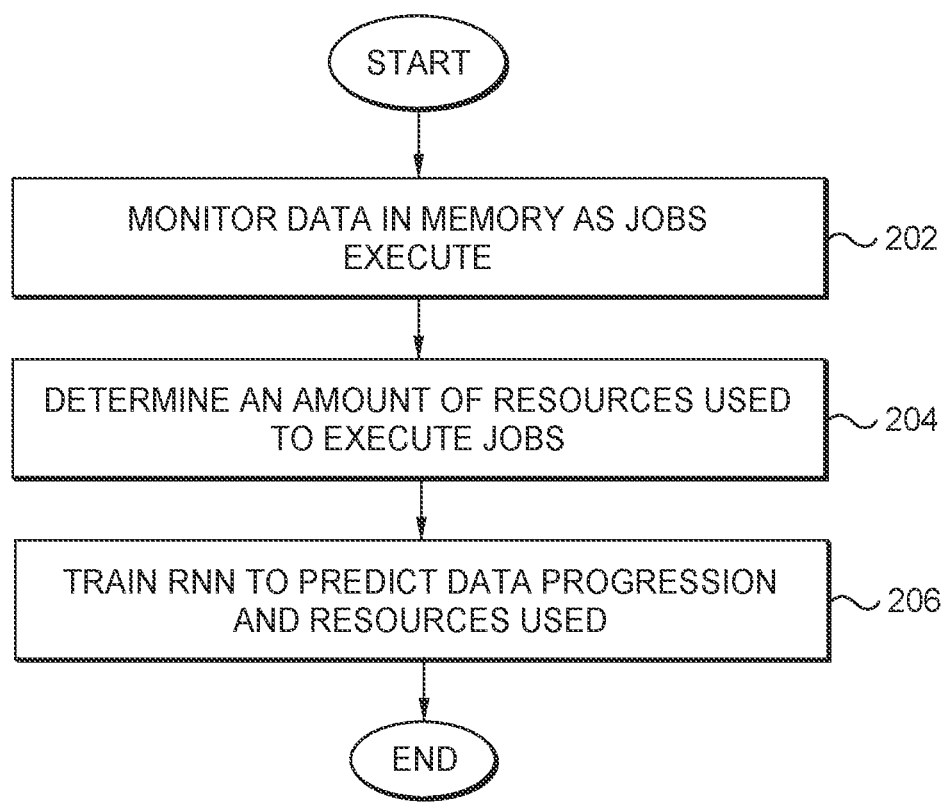
FIG. 2 is a flowchart of an example method performed in the system of FIG. 1A.

FIG. 2 is a flowchart of an example method 200 performed in the system 100 of FIG. 1A. In particular embodiments, the computing system 108 performs the method 200. By performing the method 200, the computing system 108 trains the RNN 122 to predict the resources that a server 111 or 113 in the private cloud 110 or the public cloud 112 will use at a future point in time.

In block 202, the computing system 108 monitors data 120 in a memory 117 of a server 111 or 113 as the server 111 or 113 executes jobs. The computing system 108 sends this information to the RNN 122, and the RNN 122 may determine patterns in the progression of the data 120 as the server 111 or 113 executes the jobs. This information may be used to determine how the data 120 changes over time in the server 111 or 113 so that predictions may be made as to what the data 120 will be at future points in time.

In block 204, the computing system 108 determines an amount of resources used by the server 111 or 113 to execute the jobs. The RNN 122 uses this information to learn the amount of resources used when the data 120 in the memory 117 is at a particular state. This information may then be used to predict the amount of computing resources that the server will use at a future point in time based on the predicted data 120 in the memory 117 at the future point in time.

In block 206, the computing system 108 trains the RNN 122 to predict the data progression and resources used in the server. For example, the computing system 108 may use the information determined in blocks 202 and 204 to train the RNN 122 to predict what the data 120 and the memory 117 will be at future points in time. The RNN 122 may also predict, based on the predicted data 120 and the memory 117 at the future point in time, the amount of computing resources that the server 111 or 113 will use at the future point in time. Using this prediction the computing system 108 may determine the amount of computing resources that will be available in the server 111 or 113 at the future point in time. The computing system 108 may then determine whether the server 111 or 113 can completely or successfully execute a job at that future point in time.

Figure 3:
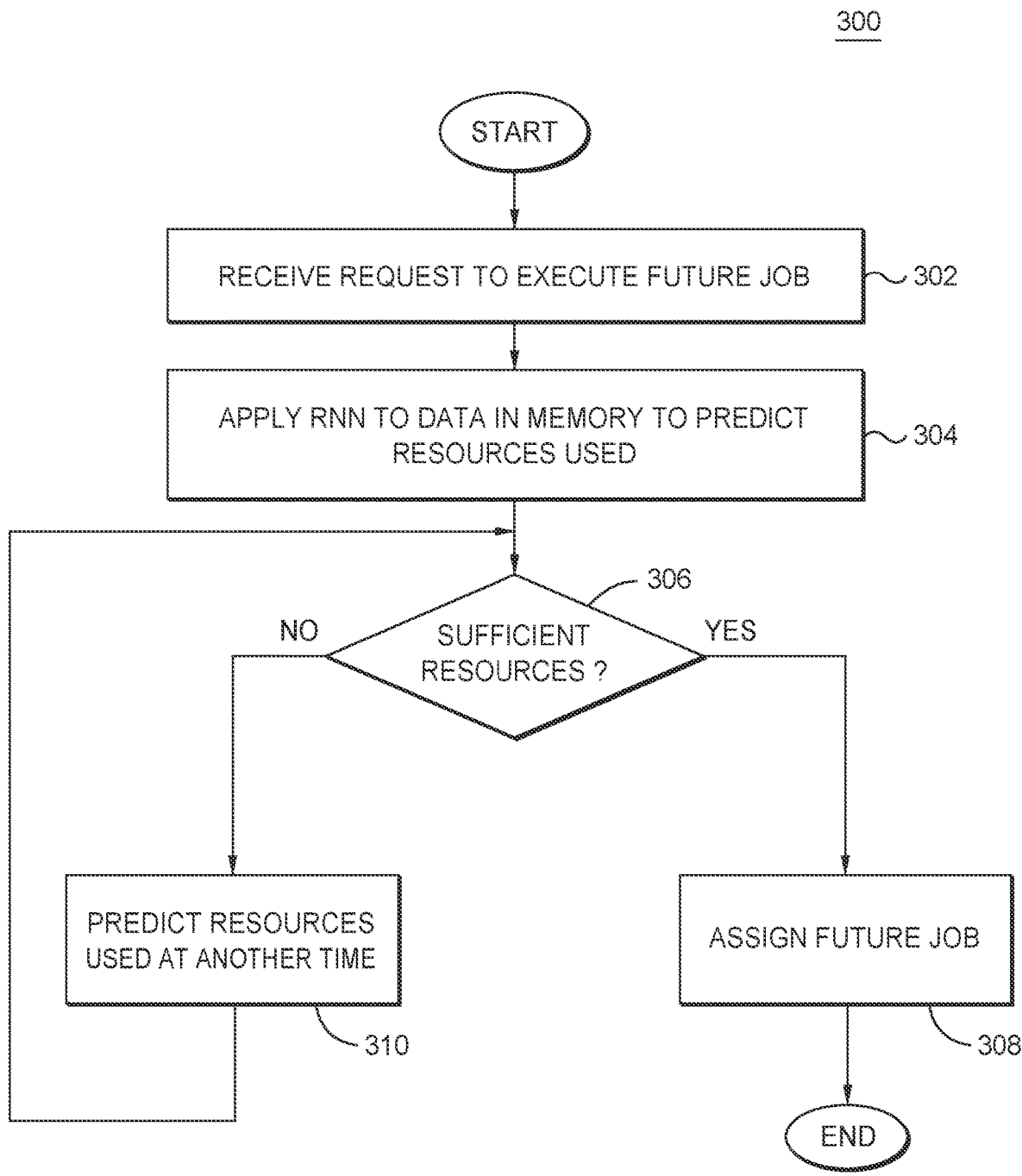
FIG. 3 is a flowchart of an example method performed in the system of FIG. 1A.

FIG. 3 is a flowchart of an example method 300 performed in the system 100 of FIG. 1A. In particular embodiments, the computing system 108 performs the method 300. By performing the method 300, the computing system 108 schedules future jobs 128 to execute on a server 111 or 113 that is predicted to have sufficient computing resources available to execute the future job 128.

In block 302, the computing system 108 receives a request to execute a future job 128. The request may indicate the future job 128 and when the future job 128 should be executed. For example, the request may indicate a deadline by which the future job 128 should be executed.

In block 304, the computing system 108 applies the RNN 122 to the data 120 and the memory 117 of a server 111 or 113 to predict a corresponding amount of computing resources that the server 111 or 113 will be using at a future point in time. As discussed previously, the RNN 122 may be trained to predict an amount of computing resources that a server 111 or 113 uses based on the data 120 in the memory 117 or that server. The RNN 122 may also be trained to predict how the data 120 in the memory 117 changes over time. Thus, the computing system 108 may apply the RNN 122 to data 120 in the memory 117 to predict what that data 120 will be at a future point in time. Then, the RNN 120 predicts, based on the data 120 at the future point in time, an amount of resources that the server 111 or 113 will be using at the future point in time.

In block 306 the computing system 108 determines whether there are sufficient resources available in the server 111 or 113 at the future point in time, based on the predicted amount of computing resources that the server 111 or 113 will be using at the future point in time. For example, the computing system 108 may subtract the predicted amount of resources that the server 111 or 113 will be using from the total amount of resources in the server 111 or 113 to determine the amount of computing resources available in the server 111 or 113 at the future point in time. The computing system 108 may then compare the amount of computing resources available in the server 111 or 113 to an amount of computing resources needed to execute the future job 128. If the amount of computing resources available in the server 111 or 113 at the future point in time exceeds the amount of computing resources needed to execute the future job 128, the computing system 108 determines that sufficient resources are available. On the other hand, if the amount of resources needed to execute the future job 128 exceeds the amount of computing resources that will be available at the future point in time, then the computing system 108 determines that there are not sufficient resources available in the server 111 or 113.

If there are not sufficient resources available at the future point in time, the computing system 108 may predict an amount of computing resources used in the server 111 or 113 at another future time in block 310. For example, the computing system 108 may apply the RNN 122 to predict the amount of resources used in the server 111 or 113 at another point in time. Alternatively or additionally, the computing system 108 may apply the RNN 122 to predict the resources used by another server 111 or 113 in the private cloud 110 or the public cloud 112 at another point in time in block 310. The computing system 108 then returns to block 306 to determine whether there will be sufficient resources available at the other point in time. This process continues until the computing system 108 determines a future point in time at which sufficient resources are available in a server 111 or 113.

When the computing system 108 determines that sufficient resources are available, the computing system 108 assigns the future job 128 to the server 111 or 113 that is predicted to have sufficient resources available at the future point in time such that the future job 128 will execute completely or successfully in block 308. In some embodiments, the computing system 108 divides the execution of the future job 128 across multiple servers 111 or 113. For example, if the future job 128 has discrete parts that can be executed on different servers 111 or 113, then the computing system 108 may schedule the future job 128 to execute on different server 111 or 113. As a result, even if one server 111 or 113 only has sufficient resources available to execute a portion of the future job 128, the server 111 or 113 can still be assigned to execute a portion of the future job 128 while one or more other servers 111 or 113 are assigned to execute the remaining portions of the future job 128.

Figure 4:
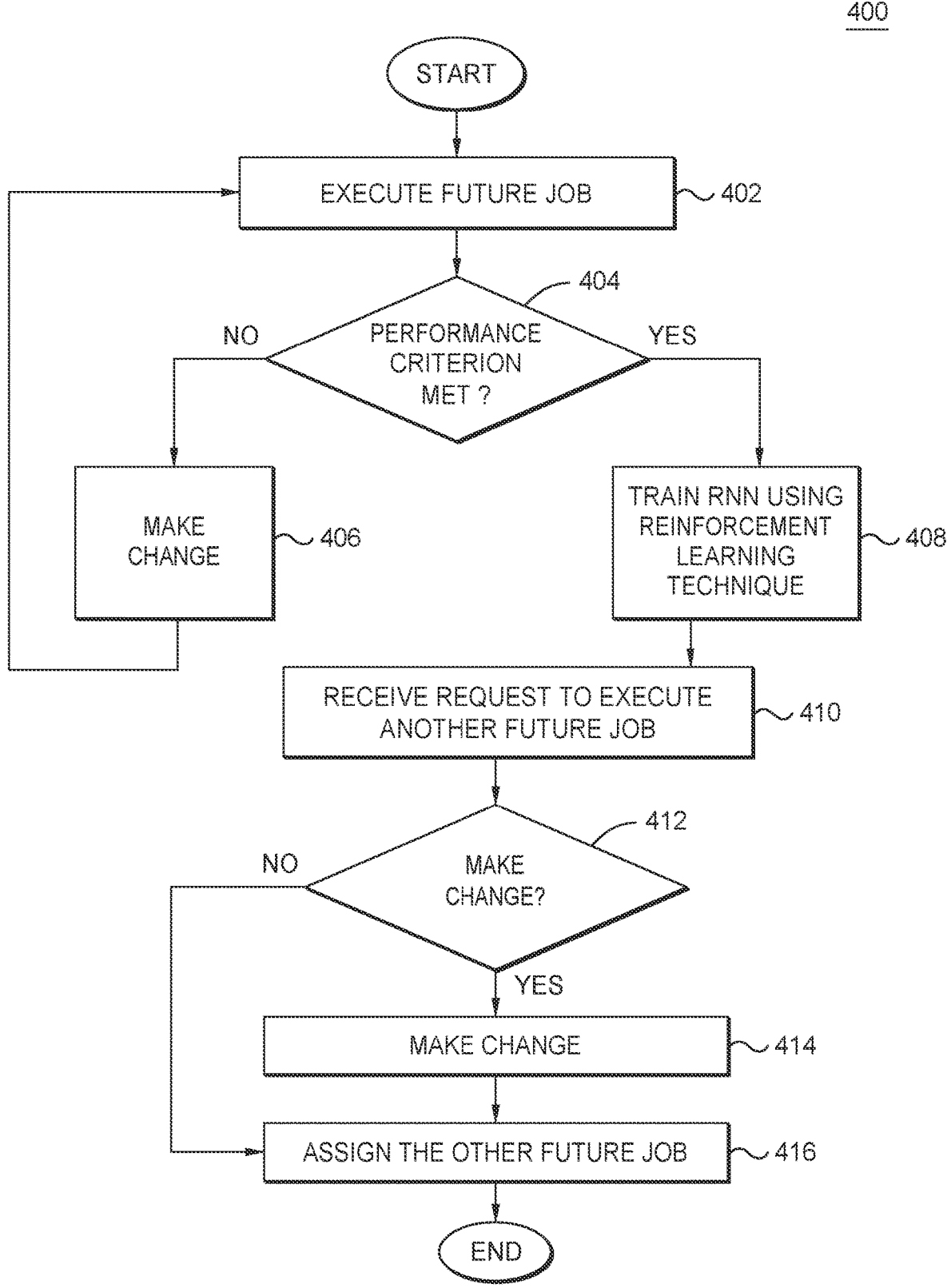
FIG. 4 is a flowchart of an example method performed in the system of FIG. 1A.

FIG. 4 is a flowchart of an example method 400 performed in the system 100 of FIG. 1A. In particular embodiments, the computing system 108 performs the method 400. By performing the method 400, the computing system 108 trains the RNN 122 to adapt or account for changes 134 in the execution environment in predicting whether execution of a job will meet a performance criterion 132.

In block 402, the computing system 108 executes a future job 128 on a server in the private cloud 110 or the public cloud 112. The computing system 108 then determines whether a performance criterion 132 was met during execution of the future job 128 in block 404. For example, the computing system 108 may determine whether the future job 128 executed completely or successfully. As another example, the computing system 108 may determine whether execution of the future job 128 generated a carbon footprint that fell below a threshold carbon footprint. As yet another example, a computing system 108 may determine whether a threshold cloud utilization was met when executing the future job 128.

If the performance criterion 132 was not met, a change 134 may be made to the execution environment. For example, a hardware or software upgrade may be made to a server 111 or 113 in the executing environment. As another example, the performance criterion 132 may be adjusted. As yet another example, a server 111 or 113 may be added to or removed from the execution environment. The computing system 108 may cause these changes 134 to occur or instruct that these changes 134 be made. After the change 134 has been made, the computing system 108 returns to execute the future job 128 on the server in block 402. The computing system 108 may then determine whether the performance criterion 132 was met after the change 134 was made. This process may continue until the computing system 108 determines that the performance criterion 132 was met.

When the performance criterion 132 is met, the computing system 108 trains the RNN 122 using a reinforcement learning technique in block 408. For example, the computing system 108 may assign one or more scores 136 to one or more changes 134 that were made. The computing system 108 may assign a positive score to a change 134 that results in the performance criterion 132 being met. The computing system 108 may assign a negative score 136 to a change 134 that results in the performance criterion 132 not being met. The computing system 108 then trains the RNN 122 using the scores 136 so that the RNN 122 learns which changes 134 resulted in positive scores 136 and which changes 134 resulted in negative scores 136. As a result, the RNN 122 may predict the changes 134 that should be made so that the performance criterion 132 may be met in the future.

In block 410, the computing system 108 receives a request to execute another future job 138. The computing system 108 applies the RNN 122 in block 412 to determine whether a change 134 should be made before executing the future job 138. The RNN 122 may analyze the future job 138 to determine that the future job 138 is similar to the future job 128 that previously executed. Additionally, the RNN 122 may analyze the score 136 for a change 134 to determine that the change 134 caused the future job 128 to execute completely or successfully in the past. In response the RNN 122 predicts that the change 134 should be made before executing the future job 138. If the score 136 is negative, then the RNN 122 may determine that the future job 128 did not execute completely or successfully in the past after the change 134 was made. In response, the RNN 122 may determine that the change 134 should not be made before the future job 138 is executed.

If the RNN 122 predicts that the change 134 should be made before the future job 138 is executed, then the change 134 may be made to a server 111 or 113 in the execution environment in block 414. For example, the computing system 108 may instruct that a hardware or software upgrade be performed in the server 111 or 113. As another example, the computing system 108 may adjust a performance criterion 132. After the change 134 is made, the computing system 108 assigns the future job 138 to the server 111 or 113 in block 316. The computing system 108 may schedule the future job 138 to execute on the server 111 or 113 at the future point in time after the change 134 is made.

If the RNN 122 determines that the change 134 should not be made in block 412, then the computing system 108 proceeds directly to block 416 to assign the future job 138 to the server 111 or 113. The computing system 108 may schedule the future job 138 for execution on the server without making the change 134.

In summary, a computing system 108 schedules jobs using a RNN 122 and a reinforcement learning technique. Generally, the RNN 122 is trained to predict how an execution environment (e.g., servers 111 or 113 on a private or public cloud 110 or 112) will change over time based on the current state of the execution environment (e.g., data 120 stored in a memory 117 of a server 111 or 113). The RNN 122 uses this prediction to determine whether the execution environment is expected to have sufficient computing resources to execute a job at a future time. The reinforcement learning technique is used to further train the RNN 122 to account for changes 134 to the execution environment in determining whether execution of the job will meet a performance criterion 132 (e.g., whether the job executed successfully, a carbon footprint, or a cloud utilization). The changes may include upgrades or updates to the execution environment (e.g., new hardware, additional servers, or new software) and changes to the performance criterion 132 (e.g., reduced carbon footprint demands or increased private cloud utilization requirements). In this manner, the RNN 122 schedules jobs using a dynamic process that improves the efficiency of job execution while meeting performance criteria, in certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the computing system 108 or related data available in the cloud. In such a case, the computing system 108 could schedule jobs for servers 111 or 113 in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
    training a recurrent neural network by monitoring data in a memory of a first server as the first server executes jobs and by determining an amount of computing resources used by the first server while executing the jobs, wherein the first server and a second server comprise software;
    applying the recurrent neural network according to a state of the data in the memory to predict an amount of computing resources that the first server will use when executing a first future job;
    assigning the first future job to execute on the first server based on the predicted amount of computing resources;
    in response to determining that execution of the first future job did not meet a performance criterion, making a change to the software of the first server of the computing system, wherein the change comprises an update to the software of the first server;
    in response to determining that execution of the first future job after making the change to the software of the first server did meet the performance criterion, further training the recurrent neural network using a reinforcement learning technique and based on the change to the software;
    in response to applying the recurrent neural network to determine that the change to the software should be made to a second server before the second server executes a second future job, making the change to the software of the second server so as to update the software of the second server before the second server executes the second future job; and
    assigning the second future job to execute on the second server.

2. The method of claim 1, wherein training the recurrent neural network using the reinforcement learning technique comprises assigning a score to the change in response to determining that execution of the first future job after making the change did meet the performance criterion.

3. The method of claim 2, wherein determining that the change should be made to the second server is based on the score.

4. The method of claim 1, wherein assigning the first future job to the first server is in response to determining that the first server has the predicted amount of computing resources available.

5. The method of claim 1, wherein the performance criterion comprises at least one of execution completion, a carbon footprint, or a ratio of cloud utilization between a public cloud and private cloud.

6. The method of claim 1, further comprising removing a scheduled job from a future job schedule in response to determining that a result from a previous execution of the scheduled job is unused.

7. The method of claim 1, further comprising assigning a third future job to execute on the first and second servers such that the first server executes a first portion of the third future job and the second server executes a second portion of the third future job.

8. The method of claim 1, wherein subsequent to the change an adjustment is made to the performance criterion.

9. The method of claim 1, wherein the update to the software comprises installing new software.

10. An apparatus comprising:
    a memory; and
    a hardware processor communicatively coupled to the memory, the hardware processor configured to:
        train a recurrent neural network by monitoring data in a memory of a first server as the first server executes jobs and by determining an amount of computing resources used by the first server while executing the jobs, wherein the first server and a second server comprise software;
        apply the recurrent neural network according to a state of the data in the memory of the first server to predict an amount of computing resources that the first server will use when executing a first future job;
        assign the first future job to execute on the first server based on the predicted amount of computing resources;
        in response to determining that execution of the first future job did not meet a performance criterion, make a change to the software of the first server of the computing system, wherein the change comprises an update to the software of the first server;
        in response to determining that execution of the first future job after making the change to the software of the first server did meet the performance criterion, further train the recurrent neural network using a reinforcement learning technique and based on the change to the software;
        in response to applying the recurrent neural network to determine that the change to the software should be made to a second server of the computing system before the second server executes a second future job, make the change to the software of so as to update the software of the second server the second server before the second server executes the second future job; and
        assign the second future job to execute on the second server.

11. The apparatus of claim 10, wherein training the recurrent neural network using the reinforcement learning technique comprises assigning a score to the change in response to determining that execution of the first future job after making the change did meet the performance criterion.

12. The apparatus of claim 11, wherein determining that the change should be made to the second server is based on the score.

13. The apparatus of claim 10, wherein assigning the first future job to the first server is in response to determining that the first server has the predicted amount of computing resources available.

14. The apparatus of claim 10, wherein the performance criterion comprises at least one of execution completion, a carbon footprint, or a ratio of cloud utilization between a public cloud and private cloud.

15. The apparatus of claim 10, the hardware processor further configured to remove a scheduled job from a future job schedule in response to determining that a result from a previous execution of the scheduled job is unused.

16. The apparatus of claim 10, the hardware processor further configured to assign a third future job to execute on the first and second servers of the computing system such that the first server executes a first portion of the third future job and the second server executes a second portion of the third future job.

17. The apparatus of claim 10 wherein subsequent to the change an adjustment is made to the performance criterion.

18. The apparatus of claim 10, wherein the update to the software comprises installing new software.

19. A computer program product for job scheduling, the computer program product comprising a computer-readable storage medium having computer-readable program code embodied therewith, the computer-readable program code executable by one or more computer processors to:

train a recurrent neural network by monitoring data in a memory of a first server as the first server executes jobs and by determining an amount of computing resources used by the first server while executing the jobs, wherein the first server and a second server comprise software;

apply the recurrent neural network according to a state of the data in the memory to predict an amount of computing resources that the first server will use when executing a first future job;

assign the first future job to execute on the first server based on the predicted amount of computing resources;

in response to determining that execution of the first future job did not meet a performance criterion, make a change to the software of the first server of the computing system, wherein the change comprises an update to the software of the first server;

in response to determining that execution of the first future job after making the change to the software of the first server did meet the performance criterion, further train the recurrent neural network using a reinforcement learning technique and based on the change to the software;

in response to applying the recurrent neural network to determine that the change to the software should be made to a second server of the computing system before the second server executes a second future job, make the change to the software of the second server so as to update the software of the second server before the second server executes the second future job; and assign the second future job to execute on the second server.

20. The computer program product of claim 19, wherein training the recurrent neural network using the reinforcement learning technique comprises assigning a score to the change in response to determining that execution of the first future job after making the change did meet the performance criterion.

* * * * *